United States Patent
Tang

(10) Patent No.: US 10,423,160 B2
(45) Date of Patent: Sep. 24, 2019

(54) LOCAL OBSTACLE AVOIDANCE WALKING METHOD OF SELF-MOVING ROBOT

(71) Applicant: Ecovacs Robotics Co., Ltd., Suzhou (CN)

(72) Inventor: Jinju Tang, Suzhou (CN)

(73) Assignee: Ecovacs Robotics Co., Ltd., Suzhou (CN)

( * ) Notice: Subject to any disclaimer, the term of this patent is extended or adjusted under 35 U.S.C. 154(b) by 172 days.

(21) Appl. No.: 15/304,032

(22) PCT Filed: Apr. 14, 2015

(86) PCT No.: PCT/CN2015/076524
§ 371 (c)(1),
(2) Date: Nov. 18, 2016

(87) PCT Pub. No.: WO2015/158245
PCT Pub. Date: Oct. 22, 2015

(65) Prior Publication Data
US 2017/0075353 A1    Mar. 16, 2017

(30) Foreign Application Priority Data
Apr. 14, 2014   (CN) .......................... 2014 1 0148518

(51) Int. Cl.
*G05D 1/02*     (2006.01)
*A47L 11/40*    (2006.01)
*A47L 1/02*     (2006.01)

(52) U.S. Cl.
CPC .............. *G05D 1/0214* (2013.01); *A47L 1/02* (2013.01); *A47L 11/4061* (2013.01); *G05D 1/02* (2013.01);
(Continued)

(58) Field of Classification Search
CPC ................... G05D 1/0214; G05D 1/02; G05D 2201/0203; G05D 1/0219; A47L 11/4061;
(Continued)

(56) References Cited

U.S. PATENT DOCUMENTS 5,890,250 A * 4/1999 Lange ....................... A47L 1/02
15/103
2004/0181896 A1   9/2004 Egawa
(Continued)

FOREIGN PATENT DOCUMENTS

CN     1365647 A     8/2002
CN     1463658 A     12/2003
(Continued)

OTHER PUBLICATIONS

International Search Report, PCT/CN2015/076524, dated Jul. 22, 2015 (4 pages).

*Primary Examiner* — Adam R Mott
(74) *Attorney, Agent, or Firm* — Nixon Peabody LLP

(57) ABSTRACT

A local obstacle avoidance walking method of a self-moving robot, comprising: step 100: the self-moving robot walks in a first direction, and when an obstacle is detected, the self-moving robot translates for a displacement M1 in a second direction perpendicular to the first direction, and step 200: determining whether the self-moving robot is able to continue to walk in the first direction after the translation, if a result of the determination is positive, the self-moving robot continues to walk in the first direction, and if the result of the determination is negative, the self-moving robot acts according to a preset instruction. The method enables the robot to accurately avoid a local obstacle, provides a concise walking route, shortens the determination time, and improves the working efficiency of the self-moving robot.

8 Claims, 5 Drawing Sheets

(52) U.S. Cl.
CPC .. *A47L 2201/04* (2013.01); *G05D 2201/0203* (2013.01)

(58) Field of Classification Search
CPC .... A47L 1/02; A47L 2201/04; A47L 1/00–16; A47L 3/00–04; A47L 7/0085; B25J 9/0003; B25J 9/1664; B25J 9/1666; B25J 9/1674; B25J 9/1676
See application file for complete search history.

(56) References Cited

U.S. PATENT DOCUMENTS

| | | | | |
|---|---|---|---|---|
| 2005/0251292 | A1* | 11/2005 | Casey | G05D 1/0238 700/245 |
| 2005/0273967 | A1* | 12/2005 | Taylor | A47L 5/28 15/319 |
| 2008/0249661 | A1* | 10/2008 | Hong | A47L 9/009 700/252 |
| 2013/0060380 | A1* | 3/2013 | Ryu | A47L 1/03 700/254 |

FOREIGN PATENT DOCUMENTS

| | | |
|---|---|---|
| CN | 201974697 U | 9/2011 |
| CN | 102253673 A | 11/2011 |
| CN | 202083959 U | 12/2011 |
| CN | 202141802 U | 2/2012 |
| CN | 102379657 A | 3/2012 |
| CN | 102541056 | 7/2012 |
| CN | 102591335 A | 7/2012 |
| CN | 102591336 A | 7/2012 |
| CN | 202537389 U | 11/2012 |
| CN | 102846269 A | 1/2013 |
| CN | 102973200 A | 3/2013 |
| CN | 103356122 A | 10/2013 |
| CN | 103505141 A | 1/2014 |
| DE | 10212964 | 10/2003 |
| JP | 3424786 | 7/2003 |
| WO | WO 2015/158245 | 10/2015 |

* cited by examiner

LOCAL OBSTACLE AVOIDANCE WALKING METHOD OF SELF-MOVING ROBOT

CROSS-REFERENCE TO RELATED APPLICATIONS

This application is an U.S. national stage of PCT/CN2015/076524, filed on Apr. 14, 2015, which claims priority to Chinese Patent Application No. 201410148518.X, filed on Apr. 14, 2014, the contents of which are each incorporated herein by reference in its entirety.

FIELD OF THE INVENTION

The present invention relates to the technical field of the manufacture of small household electric appliances, and in particular relates to a local obstacle avoidance walking method of a self-moving robot.

BACKGROUND ART

The self-moving robot has been widely used for its convenient operation and free walking, and it can realize a variety of applications, including windows-wiping, floor-sweeping, air purification and so on. One walking method of the existing self-moving robot is the random walking method, under which walking method, when the robot meets an obstacle, it firstly moves back in its original moving direction so that there is enough space left between the robot and the obstacle, and then the body of the robot turns a certain small angle in the clockwise or anticlockwise direction and continues to walk. If the robot still meets an obstacle here, it will repeat the action of moving back and turning until it avoids the obstacle, and then the robot continues to walk. However, the walking tracks of the existing robot using this kind of local obstacle avoidance method are random and complex, which wastes plenty of work time and power, leading to a low efficiency of the obstacle avoidance. On the other hand, when the robot continues to walk after successfully avoiding the local obstacle, there will be a lot of missing regions left behind or around the obstacle which are unable for the robot to reach, so that the cleaning effect is poor.

SUMMARY OF THE INVENTION

To overcome the deficiencies in the prior art, the present invention aims to provide a local obstacle avoidance walking method of a self-moving robot, which greatly shortens the robot's walking path during the local obstacle avoidance process, improves the efficiency of the obstacle avoidance, and also reduces the area of the missing regions constituted by the blocking of a certain obstacle. Therefore, the working efficiency of the self-moving robot can be greatly improved.

The technical object of the present invention is achieved through the following technical solutions.

A local obstacle avoidance walking method of a self-moving robot is provided, and the method specifically comprises the following steps:

step 100: the self-moving robot walks in a first direction, and when an obstacle is detected, the self-moving robot translates for a displacement M1 in a second direction perpendicular to the first direction, and step 200: determining whether the self-moving robot is able to continue to walk in the first direction after the translation, if a result of the determination is positive, the self-moving robot continues to walk in the first direction, and if the result of the determination is negative, the self-moving robot acts according to a preset instruction.

As needed, the action according to the preset instruction in the step 200 may comprise that the self-moving robot walks in the opposite direction to the first direction; or may further comprise that the self-moving robot translates for a displacement M1 in the second direction.

Specifically, the determination of whether the self-moving robot is able to continue to walk in the first direction in the step 200 specifically comprises that: the self-moving robot walks in the first direction firstly, and if an obstacle is not detected after that the self-moving robot walks for a certain distance, it is determined that the self-moving robot is able to continue to walk in the first direction; otherwise, it is determined that the self-moving robot is not able to continue to walk in the first direction.

In addition, there are a variety of methods which can be used to determine whether the self-moving robot is able to continue to walk in the first direction in the step 200, which specifically comprise that the bottom of the self-moving robot is provided with an attached suction cup which is used to detect whether there is a frameless edge;

or that the bottom of the self-moving robot is provided with a follower wheel which is used to detect whether there is a bump-like obstacle:

or that the side of the self-moving robot is provided with a side-looking sensor, and the self-moving robot determines whether it is able to continue to walk in the first direction according to a feedback signal of the side-looking sensor.

When the obstacle is a frameless edge, in order to prevent the self-moving robot from falling off, the step 100 specifically comprises that: the self-moving robot walks in the first direction, and when an obstacle is detected, the self-moving robot moves back for a certain distance in the first direction firstly, and then translates for a displacement M1 in the second direction.

In conclusion, the present invention greatly shortens the robot's walking path during the local obstacle avoidance process, improves the efficiency of the obstacle avoidance, and also reduces the area of the missing regions constituted by the blocking of a certain obstacle. Therefore, the working efficiency of the self-moving robot can be greatly improved.

Hereinafter, the present invention is further described in detail with reference to the attached drawings and the embodiments.

DETAILED DESCRIPTION OF PREFERRED EMBODIMENTS

Figure 1:
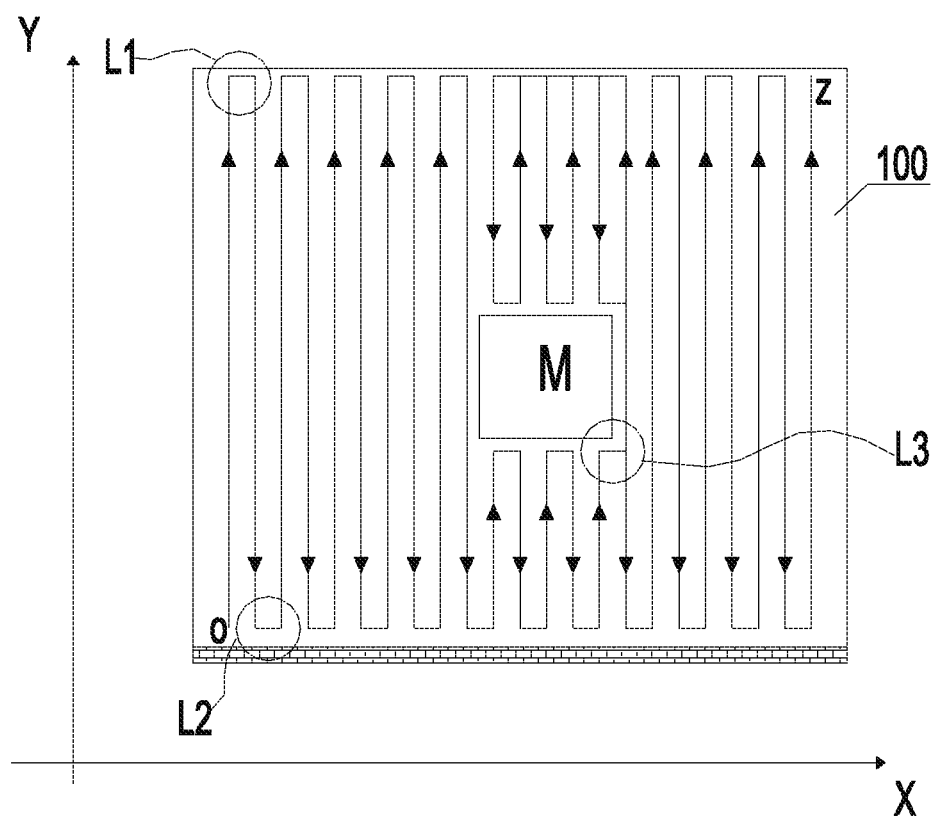
FIG. 1 is a schematic view of the obstacle avoidance walking of the window-wiping robot of the present invention.

FIG. 1 is a schematic view of the obstacle avoidance walking of the window-wiping robot of the present invention. As shown in FIG. 1, the self-moving robot in the this embodiment is a window-wiping robot. The robot starts moving from the point "O" in the lower left corner shown in FIG. 1 and walks to the point "Z" in the upper right corner along a zigzag path (as indicated by the arrows in FIG. 1), in which the robot meets the local obstacles at L1, L2 and L3, respectively, thereby completing the traversal sweeping of the working region 100. The above mentioned obstacles include not only the bump-like obstacles in the traditional sense, but also the obstacles similar to the frameless edges, both of which are referred to as the obstacles.

Figure 2:
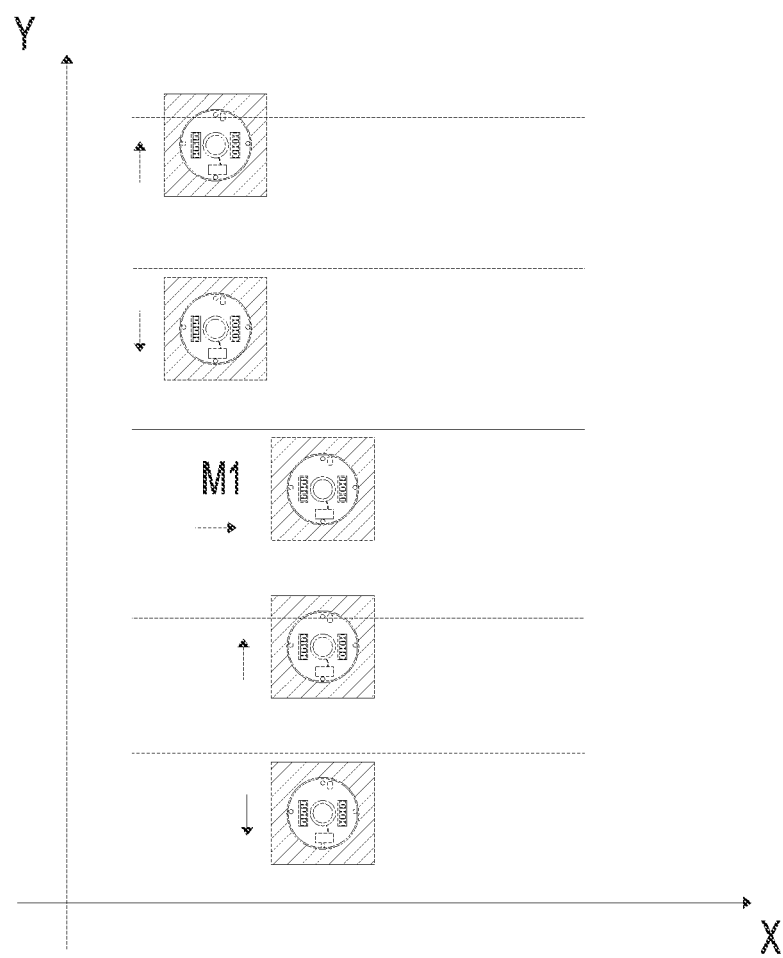
FIGS. 2 to 4 are schematic views of the local obstacle avoidance walking at L1, L2 and L3 in FIG. 1, respectively.
Figure 3:
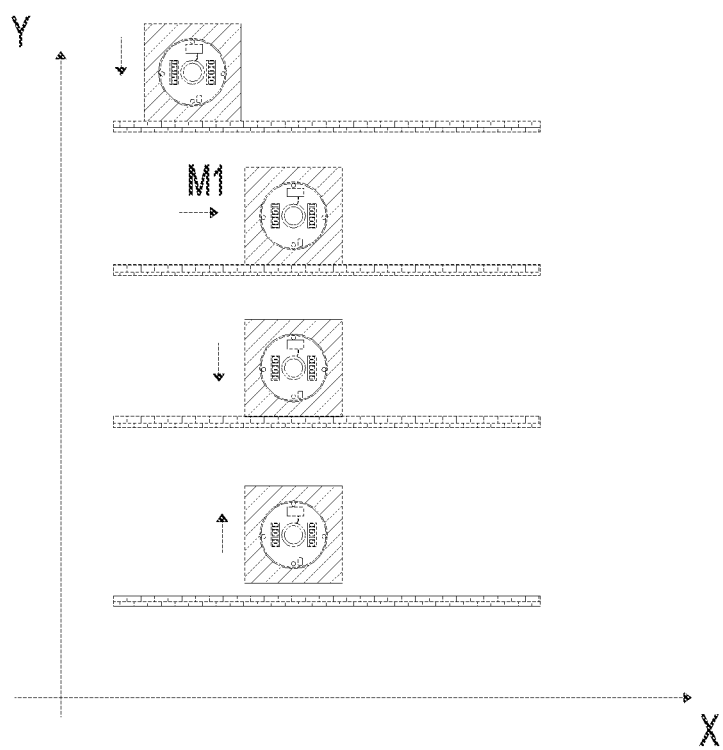
Figure 4:
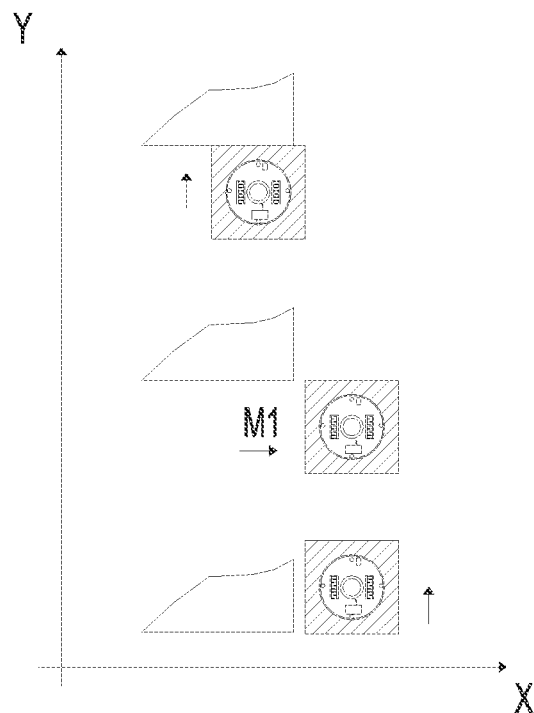
Figure 5:
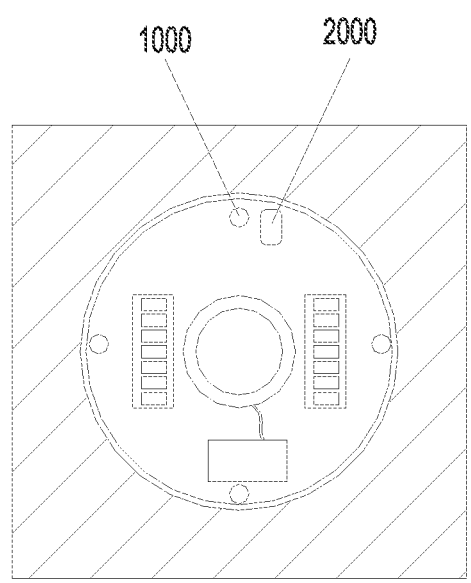
FIG. 5 is a structural schematic view of the window-wiping robot of the present invention.

FIGS. 2 to 4 are schematic views of the local obstacle avoidance walking at L1, L2 and L3 in FIG. 1, respectively, and FIG. 5 is a structural schematic view of the window-wiping robot of the present invention. In the following, the state of the local obstacle avoidance walking at each position will be described with reference to each of FIGS. 2-4 in combination with FIG. 5. Specifically, FIG. 2 is a schematic view of the obstacle avoidance walking method at L1, which is at the frameless edge, in FIG. 1, and the attached suction cup 1000 provided on the window-wiping robot is used to detect the obstacles like the frameless edge. As shown in FIG. 2 and FIG. 5, the rectangular coordinate system is established with the second direction as the X axis and the first direction as the Y axis in order to make it easier to describe the walking direction of the window-wiping robot. Specifically, the process of the local obstacle avoidance walking method is as follows: firstly, the window-wiping robot walks in the positive direction of the Y axis, and when it is detected that an air leakage occurs on the attached suction cup 1000 provided on the window-wiping robot, this position is determined to be a frameless edge, under which case the window-wiping robot will walk for a certain distance in the negative direction of the Y axis, and then translate for a displacement M1 in the positive direction of the X axis; secondly, the window-wiping robot determines whether it is able to continue to walk in the positive direction of the Y axis after the above translation.

The specific process of determining whether the window-wiping robot is able to continue to walk in the positive direction of the Y axis is that: the window-wiping robot walks in the positive direction of the Y axis firstly, and if a frameless edge is not detected by the attached suction cup after that the window-wiping robot walks for a certain distance, it is determined that the window-wiping robot is able to walk in the positive direction of the Y axis; otherwise, it is determined that the window-wiping robot is not able to walk in the positive direction of the Y axis. It is a frameless edge here. Obviously, if the window-wiping robot continues to walk in the positive direction of the Y axis, the frameless edge will be detected again by the attached suction cup after that the window-wiping robot walks for a certain distance, that is, the determination result is no, and then the window-wiping robot will walk in the negative direction of the Y axis.

FIG. 3 is a schematic view of the obstacle avoidance walking method at L2, which is at the frame, in FIG. 1, and the follower wheel 2000 provided on the window-wiping robot is used to detect the bump-like obstacles. As shown in FIG. 3 and FIG. 5, the rectangular coordinate system is established with the second direction as the X axis and the first direction as the Y axis. Specifically, the process of the local obstacle avoidance walking method is as follows: firstly, the window-wiping robot walks in the negative direction of the Y axis, and when it is detected that the follower wheel 2000 provided on the window-wiping robot stops turning, this position is determined to be a bump-like obstacle, under which case the window-wiping robot will translate for a displacement M1 in the positive direction of the X axis; secondly, the window-wiping robot determines whether it is able to continue to walk in the negative direction of the Y axis after the above translation. It is to be noted that it is only one example method that the structure of the follower wheel is used to detect whether the window-wiping robot hits the bump-like obstacle, but the detection method is not limited to this. For example, it can also achieve the same detection effect by providing a collision plate on the periphery of the window-wiping robot.

As shown in FIG. 3, the specific process of determining whether the window-wiping robot is able to continue to walk in the negative direction of the Y axis is that: the window-wiping robot tries to walk in the negative direction of the Y axis firstly, and if a bump-like obstacle is not detected by the follower wheel after that the window-wiping robot walks for a certain distance, it is determined that the window-wiping robot is able to walk in the negative direction of the Y axis; otherwise, it is determined that the window-wiping robot is not able to walk in the negative direction of the Y axis. It is a frame here. Obviously, the self-moving robot can't continue to walk in the negative direction of the Y axis due to being blocked by the frame, and the bump-like obstacle is detected again by the follower wheel 2000, that is, the determination result is no, and then the window-wiping robot will walk in the positive direction of the Y axis.

FIG. 4 is a schematic view of the obstacle avoidance walking method at L3, which is at the obstacle within the walking region, in FIG. 1, and the obstacle is also a bump-like obstacle. As shown in FIG. 4 and FIG. 5, the rectangular coordinate system is established with the second direction as the X axis and the first direction as the Y axis. Specifically, the process of the local obstacle avoidance walking method is as follows: firstly, the window-wiping robot walks in the positive direction of the Y axis, and when an obstacle is detected, the window-wiping robot translates for a displacement M1 in the positive direction of the X axis, secondly, the window-wiping robot determines whether it is able to continue to walk in the positive direction of the Y axis after the above translation.

The specific process of determining whether the window-wiping robot is able to continue to walk in the positive direction of the Y axis is basically the same as that of the above determination method of walking to the frame, and thus it is omitted here. The difference therebetween is that the window-wiping robot in this embodiment firstly tries to continue to walk in the positive direction of the Y axis after the translating for a displacement M1 in the positive direction of the X axis, and if the obstacle is not detected after that the window-wiping robot walks for a certain distance, the window-wiping robot continues to walk in the positive direction of the Y axis until reaching the frameless edge. At this point, the window-wiping robot also firstly tries to continue to walk in the original direction, i.e. in the positive direction of the Y axis, after the translating for a displacement M1 in the positive direction of the X axis, and if it is determined that it is still the frameless edge and it is not able to continue to walk in the original direction, the window-wiping robot will walk in the negative direction of the Y axis. The determination of the above L2 position is carried out when meeting the frame, and then the robot repeats the movement until reaching the point "Z", thereby completing the sweeping of the working region 100. Obviously, there is a missing region above the obstacle M, i.e. the F zone in FIG. 7, in the case of the above walking method. As shown in FIG. 1, in order to optimize the walking path and avoid a missing region, when the robot gets away from the obstacle M at L3 and detects the frameless edge, the robot is controlled to walk in the negative direction of the X axis, thereby completing the traversal walking on the region above the obstacle M.

In the above embodiments, the window-wiping robot firstly tries to walk for a certain distance in the original walking direction along the Y axis after translating along X axis, and then determines whether it is able to walk in the original walking direction along the Y axis through the detection information of the attached suction cup and the follower wheel. Of course, the method that determines whether the window-wiping robot is able to walk in the original walking direction along the Y axis is not limited to this. For example, the side of the window-wiping robot can be provided with a side-looking sensor, and the window-wiping robot can also determine whether it is able to walk in the positive direction of the Y axis according to a feedback signal of the side-looking sensor. Specifically, it can be achieved by providing an infrared transmitter and an infrared receiver on the side of the robot in the horizontal direction, in which the signal transmitted by the transmitter is reflected by the frame and then received by the receiver in the case of the frame; and the signal is transmitted obliquely downward by the transmitter and then received by the receiver correspondingly in the case of the frameless edge.

It is to be noted that the local obstacle avoidance walking method of a self-moving robot is described by taking the window-wiping robot as an example only in the above embodiment. Of course, in addition to the window-wiping robot, the above method is also applicable to the other self-moving robots including the floor-sweeping robot.

In view of the above contents, the present invention provides a local obstacle avoidance walking method of a self-moving robot, and the method specifically comprises the following steps:

step 100: the self-moving robot walks in a first direction, and when an obstacle is detected, the self-moving robot translates for a displacement M1 in a second direction perpendicular to the first direction; and step 200: determining whether the self-moving robot is able to continue to walk in the first direction after the translation, if a result of the determination is positive, the self-moving robot continues to walk in the first direction, and if the result of the determination is negative, the self-moving robot acts according to a corresponding instruction.

As needed, the action according to the corresponding instruction in the step 200 may comprise that the self-moving robot walks in the opposite direction to the first direction; or may further comprise that the self-moving robot translates for a displacement M1 in the second direction.

Specifically, the determination of whether the self-moving robot is able to continue to walk in the first direction in the step 200 specifically comprises that: the self-moving robot walks in the first direction firstly, and if an obstacle is not detected after that the self-moving robot walks for a certain distance, it is determined that the self-moving robot is able to continue to walk in the first direction; otherwise, it is determined that the self-moving robot is not able to continue to walk in the first direction.

In addition, there are a variety of methods which can be used to determine whether the self-moving robot is able to continue to walk in the first direction in the step 200, which specifically comprise that the bottom of the self-moving robot is provided with an attached suction cup which is used to detect whether there is a frameless edge;

or that the bottom of the self-moving robot is provided with a follower wheel which is used to detect whether there is a bump-like obstacle;

or that the side of the self-moving robot is provided with a side-looking sensor, and the self-moving robot determines whether it is able to continue to walk in the first direction according to a feedback signal of the side-looking sensor.

When the obstacle is a frameless edge, in order to prevent the self-moving robot from falling off, the step 100 specifically comprises that: the self-moving robot walks in the first direction, and when an obstacle is detected, the self-moving robot moves back for a certain distance in the first direction firstly, and then translates for a displacement M1 in the second direction.

Figure 6:
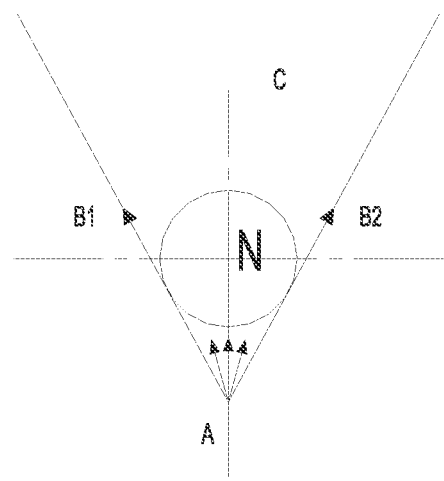
FIG. 6 and FIG. 7 are schematic views of the missing region caused due to the obstacle avoidance of the prior art and of the present invention, respectively.
Figure 7:
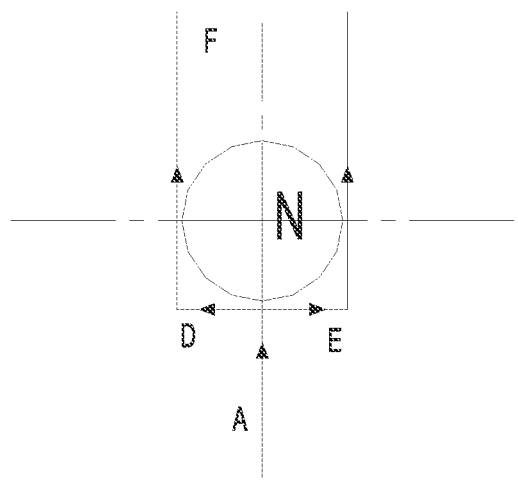

FIG. 6 and FIG. 7 are schematic views of the missing region caused due to the obstacle avoidance of the prior art and of the present invention, respectively. As shown in FIG. 6, when the robot in the prior art walks in the direction of A and meets the obstacle N, it walks in the direction of B1 or B2 and avoids the obstacle N finally by repeatedly moving back and turning. In this case, the missing region caused by the obstacle N is the sectorial area of the C zone. As shown in FIG. 7, when the robot in the present invention walks in the direction of A and meets the obstacle N, it can avoid the obstacle N finally by the motion track in the direction D translating to the left or by the motion track in the direction E translating to the right. In this case, the missing region caused by the obstacle N is the rectangular area of the F zone. Obviously, the area of the C zone is much larger than that of the F zone.

In conclusion, the present invention greatly shortens the robot's walking path during the local obstacle avoidance process, improves the efficiency of the obstacle avoidance, and also reduces the area of the missing regions constituted by the blocking of a certain obstacle. Therefore, the working efficiency of the self-moving robot can be greatly improved.

The invention claimed is:

1. A local obstacle avoidance walking method of a self-moving robot, the method comprising the following steps:
step 100: the self-moving robot walks in a first direction, and when an obstacle is detected, the self-moving robot translates for a displacement M1 in a second direction perpendicular to the first direction; and
step 200: determining whether the self-moving robot is able to continue to walk in the first direction after the translation, if a result of the determination is positive, the self-moving robot continues to walk in the first direction, and if the result of the determination is negative, the self-moving robot acts according to a preset instruction,
characterized in that, the action according to the preset instruction in the step 200 comprises that the self-moving robot walks in the opposite direction to the first direction,
characterized in that, the determination of whether the self-moving robot is able to continue to walk in the first direction in the step 200 specifically comprises that the self-moving robot walks in the first direction firstly, and if an obstacle is not detected after that the self-moving robot walks for a certain distance, it is determined that the self-moving robot is able to continue to walk in the first direction; otherwise, it is determined that the self-moving robot is not able to continue to walk in the first direction,
characterized in that, the determination of whether the self-moving robot is able to continue to walk in the first direction in the step 200 specifically further comprises that the bottom of the self-moving robot is provided with an attached suction cup which is used to detect whether there is a frameless edge.

2. The local obstacle avoidance walking method of the self-moving robot of claim 1, characterized in that, the determination of whether the self-moving robot is able to continue to walk in the first direction in the step 200 specifically further comprises that:

the bottom of the self-moving robot is provided with a follower wheel which is used to detect whether there is a bump-like obstacle.

3. The local obstacle avoidance walking method of the self-moving robot of claim 1, characterized in that, the determination of whether the self-moving robot is able to continue to walk in the first direction in the step 200 specifically comprises that:

the side of the self-moving robot is provided with a side-looking sensor, and the self-moving robot determines whether it is able to continue to walk in the first direction according to a feedback signal of the side-looking sensor.

4. The local obstacle avoidance walking method of the self-moving robot of claim 1, wherein the step 100 further comprises that when a frameless edge is detected, the self-moving robot moves back for a certain distance in the first direction firstly, and then translates for a displacement M1 in the second direction.

5. A local obstacle avoidance walking method of a self-moving robot, the method comprising the following steps:

step 100: the self-moving robot walks in a first direction, and when an obstacle is detected, the self-moving robot translates for a displacement M1 in a second direction perpendicular to the first direction; and step 200: determining whether the self-moving robot is able to continue to walk in the first direction after the translation, if a result of the determination is positive, the self-moving robot continues to walk in the first direction, and if the result of the determination is negative, the self-moving robot acts according to a preset instruction, characterized in that, the action according to the preset instruction in the step 200 further comprises that the self-moving robot translates for a displacement M1 in the second direction, characterized in that, the determination of whether the self-moving robot is able to continue to walk in the first direction in the step 200 specifically comprises that: the self-moving robot walks in the first direction firstly, and if an obstacle is not detected after that the self-moving robot walks for a certain distance, it is determined that the self-moving robot is able to continue to walk in the first direction; otherwise, it is determined that the self-moving robot is not able to continue to walk in the first direction, characterized in that, the determination of whether the self-moving robot is able to continue to walk in the first direction in the step 200 specifically further comprises that: the bottom of the self-moving robot is provided with an attached suction cup which is used to detect whether there is a frameless edge.

6. The local obstacle avoidance walking method of the self-moving robot of claim 5, characterized in that, the determination of whether the self-moving robot is able to continue to walk in the first direction in the step 200 specifically further comprises that:

the bottom of the self-moving robot is provided with a follower wheel which is used to detect whether there is a bump-like obstacle.

7. The local obstacle avoidance walking method of the self-moving robot of claim 5, characterized in that, the determination of whether the self-moving robot is able to continue to walk in the first direction in the step 200 specifically comprises that:

the side of the self-moving robot is provided with a side-looking sensor, and the self-moving robot determines whether it is able to continue to walk in the first direction according to a feedback signal of the side-looking sensor.

8. The local obstacle avoidance walking method of the self-moving robot of claim 5, wherein the step 100 further comprises that when a frameless edge is detected, the self-moving robot moves back for a certain distance in the first direction firstly, and then translates for a displacement M1 in the second direction.

* * * * *